(12) United States Patent
Kwon et al.

(10) Patent No.: US 8,940,836 B2
(45) Date of Patent: *Jan. 27, 2015

(54) POLYCARBONATE RESIN COMPOSITION WITH IMPROVED TRANSPARENCY AND SCRATCH-RESISTANCE (75) Inventors: Kee Hae Kwon, Uiwang-si (KR); Il Jin Kim, Uiwang-si (KR); Jin Hwa Chung, Uiwang-si (KR); Sang Ki Park, Uiwang-si (KR); Ja Kwan Koo, Uiwang-si (KR); Bok Nam Jang, Uiwang-si (KR); Jin Hwan Choi, Uiwang-si (KR); Tae Uk Kim, Uiwang-si (KR); Byeong Chun Lee, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 519 days.

This patent is subject to a terminal disclaimer.

(21) Appl. No.: 12/631,018

(22) Filed: Dec. 4, 2009

(65) Prior Publication Data

US 2010/0152357 A1 Jun. 17, 2010

(30) Foreign Application Priority Data

Dec. 17, 2008 (KR) ........................ 10-2008-0128435

(51) Int. Cl.
| | | |
|---|---|---|
| *C08L 69/00* | (2006.01) | |
| *C08L 33/10* | (2006.01) | |
| *C08L 33/12* | (2006.01) | |
| *C08L 33/08* | (2006.01) | |
| C08L 31/04 | (2006.01) | |
| C08L 33/24 | (2006.01) | |
| C08L 35/06 | (2006.01) | |

(52) U.S. Cl.
CPC ................. *C08L 33/08* (2013.01); *C08L 69/00* (2013.01); *C08L 69/005* (2013.01); C08L 31/04 (2013.01); C08L 33/10 (2013.01); C08L 33/24 (2013.01); C08L 35/06 (2013.01); C08L 2205/02 (2013.01); C08L 2205/03 (2013.01)
USPC .......................................... 525/133; 525/148

(58) Field of Classification Search
None
See application file for complete search history.

(56) References Cited

U.S. PATENT DOCUMENTS

| | | | |
|---|---|---|---|
| 3,322,853 A | 5/1967 | Trementozzi et al. | |
| 3,839,513 A | 10/1974 | Patel | |
| 3,898,300 A | 8/1975 | Hillard | |
| 4,027,073 A | 5/1977 | Clark | |
| 4,045,514 A * | 8/1977 | Iwahashi et al. ............... | 525/148 |
| 4,062,909 A | 12/1977 | Morgan et al. | |
| 4,102,853 A | 7/1978 | Kawamura et al. | |
| 4,117,041 A | 9/1978 | Guschl | |
| 4,287,315 A | 9/1981 | Meyer et al. | |
| 4,303,772 A | 12/1981 | Novicky | |
| 4,391,935 A | 7/1983 | Bialous et al. | |
| 4,400,333 A | 8/1983 | Neefe | |
| 4,544,706 A * | 10/1985 | Finch et al. ..................... | 525/146 |
| 4,632,946 A | 12/1986 | Muench et al. | |
| 4,634,734 A | 1/1987 | Hambrecht et al. | |
| 4,692,488 A | 9/1987 | Kress et al. | |
| 4,745,029 A * | 5/1988 | Kambour ....................... | 428/412 |
| 4,883,835 A | 11/1989 | Buysch et al. | |
| 4,906,696 A | 3/1990 | Fischer et al. | |
| 4,914,144 A | 4/1990 | Muehlbach et al. | |
| 4,918,159 A | 4/1990 | Nakamura et al. | |
| 4,983,658 A | 1/1991 | Kress et al. | |
| 4,988,748 A | 1/1991 | Fuhr et al. | |
| 4,997,883 A | 3/1991 | Fischer et al. | |
| 5,061,558 A | 10/1991 | Fischer et al. | |
| 5,061,745 A | 10/1991 | Wittmann et al. | |
| 5,200,492 A * | 4/1993 | Ohnaga et al. ................ | 428/64.7 |
| 5,204,394 A | 4/1993 | Gosens et al. | |
| 5,206,404 A | 4/1993 | Gunkel et al. | |
| 5,218,030 A | 6/1993 | Katayose et al. | |
| 5,219,907 A | 6/1993 | Niessner et al. | |
| 5,229,443 A | 7/1993 | Wroczynski | |
| 5,239,001 A | 8/1993 | Fischer et al. | |
| 5,274,031 A | 12/1993 | Eichenauer et al. | |
| 5,280,070 A | 1/1994 | Drzewinski et al. | |
| 5,284,916 A | 2/1994 | Drzewinski | |
| 5,292,809 A | 3/1994 | Drzewinski et al. | |
| 5,306,778 A | 4/1994 | Ishida et al. | |
| 5,449,557 A * | 9/1995 | Liebler et al. ................. | 428/412 |
| 5,451,650 A | 9/1995 | Siol et al. | |

(Continued)

FOREIGN PATENT DOCUMENTS

| | | |
|---|---|---|
| CA | 1 121 535 | 4/1982 |
| CN | 1377913 A | 11/2002 |

(Continued)

OTHER PUBLICATIONS

Katrizky, Correlation and Prediction of the Refractive Indices of Polymers by QSPR; Journal of Chemical Information and Computer Sciences; 1998; pp. 1171-1176.*

(Continued)

*Primary Examiner* — David Buttner
(74) *Attorney, Agent, or Firm* — Additon, Higgins & Pendleton, P.A.

(57) ABSTRACT

A polycarbonate resin composition can have improved transparency and scratch resistance of the present invention and comprises about 10 to about 99% by weight of polycarbonate resin (A); and about 1 to about 90% by weight of acrylic copolymer with ultra-low molecular weight and high refractive index (B). The resin composition of the present invention can further comprise acrylic resin (C). The acrylic copolymer with ultra-low molecular weight and high refractive index (B) can have a refractive index of about 1.495 to about 1.590 and a weight average molecular weight of about 3,000 to about 40,000 g/mol.

11 Claims, 3 Drawing Sheets

(56) References Cited

U.S. PATENT DOCUMENTS

| | | | |
|---|---|---|---|
| 5,473,019 A | 12/1995 | Siol et al. |
| 5,605,962 A | 2/1997 | Suzuki et al. |
| 5,627,228 A | 5/1997 | Kobayashi |
| 5,643,981 A | 7/1997 | Yang et al. |
| 5,672,645 A | 9/1997 | Eckel et al. |
| 5,731,390 A | 3/1998 | van Helmond et al. |
| 5,750,602 A | 5/1998 | Kohler et al. |
| 5,833,886 A | 11/1998 | Dashevsky et al. |
| 5,905,122 A | 5/1999 | Ohtsuka et al. |
| 5,955,184 A | 9/1999 | Honda et al. |
| 6,022,917 A | 2/2000 | Kobayashi |
| 6,063,889 A | 5/2000 | Friebe et al. |
| 6,083,428 A | 7/2000 | Ueda et al. |
| 6,111,024 A | 8/2000 | McKee et al. |
| 6,127,465 A | 10/2000 | Nodera |
| 6,174,945 B1 | 1/2001 | Kim et al. |
| 6,252,002 B1 | 6/2001 | Yamada et al. |
| 6,337,371 B2 | 1/2002 | Kurata et al. |
| 6,369,141 B1 | 4/2002 | Ishii et al. |
| 6,380,304 B1 | 4/2002 | Vanspeybroeck et al. |
| 6,437,029 B1 | 8/2002 | Lim et al. |
| 6,528,559 B1 | 3/2003 | Nakacho et al. |
| 6,528,561 B1 | 3/2003 | Zobel et al. |
| 6,566,428 B1 | 5/2003 | Ecket et al. |
| 6,576,161 B2 | 6/2003 | Lim et al. |
| 6,596,794 B1 | 7/2003 | Ecket et al. |
| 6,596,893 B2 | 7/2003 | Nakacho et al. |
| 6,613,822 B1 | 9/2003 | Eckel et al. |
| 6,613,824 B2 | 9/2003 | Campbell et al. |
| 6,630,524 B1 | 10/2003 | Lim et al. |
| 6,646,068 B2 | 11/2003 | Chisholm et al. |
| 6,686,404 B1 | 2/2004 | Eckel et al. |
| 6,716,900 B2 | 4/2004 | Jang et al. |
| 6,762,228 B2 | 7/2004 | Seidel et al. |
| 6,849,689 B2 | 2/2005 | Yamada et al. |
| 6,890,979 B2 | 5/2005 | Eichenauer et al. |
| 6,914,089 B2 | 7/2005 | Eckel et al. |
| 6,956,072 B1 | 10/2005 | Kanaka et al. |
| 7,001,944 B2 | 2/2006 | Vathauer et al. |
| 7,067,188 B1 | 6/2006 | Yang et al. |
| 7,094,818 B2 | 8/2006 | Lim et al. |
| 7,294,659 B2 | 11/2007 | Yatake |
| 7,511,088 B2 | 3/2009 | Lim et al. |
| 7,550,523 B2 | 6/2009 | Lim et al. |
| 7,659,332 B2 | 2/2010 | Kang et al. |
| 7,732,515 B2 | 6/2010 | Jang et al. |
| 7,767,738 B2 | 8/2010 | Gaggar et al. |
| 7,956,127 B2 | 6/2011 | Lee et al. |
| 8,119,726 B2 | 2/2012 | Lim et al. |
| 8,304,494 B2 | 11/2012 | Park et al. |
| 8,507,594 B2 | 8/2013 | Kwon et al. |
| 8,541,506 B2 | 9/2013 | Kwon et al. |
| 8,557,912 B2 | 10/2013 | Chung et al. |
| 2001/0009946 A1 | 7/2001 | Catsman et al. |
| 2002/0042483 A1 | 4/2002 | Vanderbilt |
| 2002/0115759 A1 | 8/2002 | Eckel et al. |
| 2002/0151624 A1 | 10/2002 | Kobayashi |
| 2003/0139504 A1 | 7/2003 | Miebach et al. |
| 2004/0013882 A1 | 1/2004 | Gorny et al. |
| 2004/0122139 A1 | 6/2004 | Yang et al. |
| 2004/0192814 A1 | 9/2004 | Yang et al. |
| 2004/0198877 A1 | 10/2004 | Yang et al. |
| 2004/0249027 A1 | 12/2004 | Lim et al. |
| 2004/0249070 A1 | 12/2004 | Lim et al. |
| 2005/0159533 A1 | 7/2005 | Nabeshima et al. |
| 2005/0245648 A1 | 11/2005 | Lim et al. |
| 2006/0004154 A1 | 1/2006 | DeRudder et al. |
| 2006/0014863 A1 | 1/2006 | Lim et al. |
| 2006/0030647 A1 | 2/2006 | Ebeling et al. |
| 2006/0100307 A1 | 5/2006 | Uerz et al. |
| 2007/0155873 A1 | 7/2007 | Kang et al. |
| 2007/0249767 A1 | 10/2007 | Kang et al. |
| 2007/0249768 A1 | 10/2007 | Hong et al. |
| 2007/0287799 A1 | 12/2007 | Ha et al. |
| 2007/0295946 A1 | 12/2007 | Lim et al. |
| 2008/0182926 A1 | 7/2008 | Lim et al. |
| 2009/0054568 A1 | 2/2009 | Uejima et al. |
| 2009/0080079 A1 | 3/2009 | Kogure et al. |
| 2009/0093583 A1 | 4/2009 | Kawato et al. |
| 2009/0118402 A1 | 5/2009 | Jang et al. |
| 2010/0029855 A1 | 2/2010 | Matsuoka et al. |
| 2010/0152357 A1 | 6/2010 | Kwon et al. |
| 2010/0168272 A1* | 7/2010 | Park et al. ............ 523/122 |
| 2010/0240831 A1 | 9/2010 | Kim et al. |
| 2010/0256288 A1* | 10/2010 | Kim et al. ............ 524/523 |
| 2011/0009524 A1 | 1/2011 | Kwon et al. |
| 2011/0021677 A1 | 1/2011 | Kwon et al. |
| 2011/0040019 A1 | 2/2011 | Kwon et al. |
| 2011/0160377 A1 | 6/2011 | Chung et al. |
| 2011/0160380 A1 | 6/2011 | Kwon et al. |

FOREIGN PATENT DOCUMENTS

| | | |
|---|---|---|
| CN | 101061179 A | 10/2007 |
| DE | 19614845 A1 | 10/1997 |
| DE | 196 32 675 A1 | 2/1998 |
| DE | 19801198 A1 | 7/1999 |
| DE | 10061081 A1 | 6/2002 |
| EP | 0149813 | 7/1985 |
| EP | 0370344 A2 | 5/1990 |
| EP | 0 449 689 A1 | 10/1991 |
| EP | 0483717 A2 | 5/1992 |
| EP | 0 612 806 A1 | 8/1994 |
| EP | 0640655 A3 | 3/1995 |
| EP | 0 661 342 A1 | 7/1995 |
| EP | 0 700 968 A1 | 3/1996 |
| EP | 0 728 811 A2 | 8/1996 |
| EP | 0 767 204 A2 | 4/1997 |
| EP | 0771852 A2 | 5/1997 |
| EP | 0 795 570 A1 | 9/1997 |
| EP | 0909790 A1 | 4/1999 |
| EP | 0 970 997 A2 | 1/2000 |
| EP | 1010725 A2 | 6/2000 |
| EP | 1 069 156 A1 | 1/2001 |
| EP | 1069154 A | 1/2001 |
| EP | 1209163 A1 | 5/2002 |
| EP | 2204412 A1 | 7/2010 |
| JP | 59-149912 A | 8/1984 |
| JP | 59-202240 | 11/1984 |
| JP | 04-023856 A | 1/1992 |
| JP | 04359954 | * 12/1992 |
| JP | 61 00785 | 1/1994 |
| JP | 06-100785 | 4/1994 |
| JP | 06-313089 A | 11/1994 |
| JP | 7-76649 | 3/1995 |
| JP | 08-012868 A | 1/1996 |
| JP | 8-208884 | 8/1996 |
| JP | 08-239544 A | 9/1996 |
| JP | 09-053009 A | 2/1997 |
| JP | 10-017762 A | 1/1998 |
| JP | 2000-154277 A1 | 6/2000 |
| JP | 2001-049072 A | 2/2001 |
| JP | 2001-316580 A | 11/2001 |
| JP | 2002-080676 | 3/2002 |
| JP | 2002-348457 A | 12/2002 |
| JP | 2005-247999 A | 9/2005 |
| JP | 2006-131833 | 5/2006 |
| JP | 2006-249288 A | 9/2006 |
| JP | 2006-249292 A | 9/2006 |
| JP | 2006-257126 | 9/2006 |
| JP | 2006-257284 A | 9/2006 |
| JP | 2006-342246 A | 12/2006 |
| JP | 2007-023227 A | 2/2007 |
| JP | 2008-292853 A | 12/2008 |
| KR | 1994-0014647 | 7/1994 |
| KR | 1996-14253 A | 5/1996 |
| KR | 1999-47019 A1 | 7/1999 |
| KR | 2000 41992 A1 | 1/2000 |
| KR | 1020000009218 A | 2/2000 |
| KR | 10-2000-0048033 A | 7/2000 |
| KR | 102000041993 A | 7/2000 |
| KR | 10-2000-0055347 A1 | 9/2000 |
| KR | 2001 109044 A1 | 12/2001 |
| KR | 2002 6350 A1 | 1/2002 |

(56) References Cited

FOREIGN PATENT DOCUMENTS

| | | |
|---|---|---|
| KR | 100360710 B | 10/2002 |
| KR | 2002 83711 A1 | 11/2002 |
| KR | 2001 107423 A1 | 12/2002 |
| KR | 1020020094345 A | 12/2002 |
| KR | 10-2003-0020584 A | 3/2003 |
| KR | 10-2003-0055443 A | 7/2003 |
| KR | 2003-0095537 A | 12/2003 |
| KR | 10-2004-0007788 A | 1/2004 |
| KR | 1020040058809 A | 7/2004 |
| KR | 2004-79118 A1 | 9/2004 |
| KR | 10-0648114 B1 | 11/2006 |
| KR | 10-0767428 B1 | 10/2007 |
| KR | 885819 B1 | 2/2009 |
| KR | 10-902352 | 6/2009 |
| WO | 99 19383 A1 | 4/1999 |
| WO | 99/57198 A1 | 11/1999 |
| WO | 00/18844 A1 | 4/2000 |
| WO | 00 00544 A1 | 1/2001 |
| WO | 01/66634 A | 9/2001 |
| WO | 00 09518 A1 | 2/2002 |
| WO | 02 46287 A1 | 6/2002 |
| WO | 03/020827 A1 | 3/2003 |
| WO | 03/022928 A1 | 3/2003 |
| WO | 03/042303 A1 | 5/2003 |
| WO | 03/042305 A1 | 5/2003 |
| WO | 2004/007611 A1 | 1/2004 |
| WO | 2006 041237 A1 | 4/2006 |
| WO | 2007/004434 A1 | 1/2007 |
| WO | 2007/119920 A1 | 10/2007 |
| WO | 2007/140101 A1 | 12/2007 |
| WO | 2008/081791 A1 | 7/2008 |
| WO | 2009/078593 A1 | 6/2009 |
| WO | 2009/078602 A1 | 6/2009 |
| WO | 2009/113762 A2 | 9/2009 |
| WO | 2009/116722 A1 | 9/2009 |
| WO | 2009/128601 A1 | 10/2009 |

OTHER PUBLICATIONS

Mark, Physical Properties of Polymers Handbook 2$^{nd}$ Edition; 2007; pp. 5-7.*
Polysciences Inc data sheet for benzyl acrylate; no date.*
Guidechem data sheet for RUVA-93; no date.*
Chinese Office Action in counterpart Chinese Application No. 200910211954 dated Jun. 23, 2011, pp. 1-5.
English translation of Chinese Office Action in counterpart Chinese Application No. 200910211954 dated Jun. 23, 2011, pp. 1-7.
International Search Report in commonly owned International Application No. PCT/KR2008/006870, dated Mar. 28, 2009.
European Search Report in commonly owned European Application No. 08862371 dated Dec. 7, 2010, pp. 1-6.
Xu, "Predicition of Refractive Indices of Linear Polymers by a four-descriptor QSPR model", Polymer, 45 (2004) pp. 8651-8659.
Office Action in commonly owned U.S. Appl. No. 12/642,904 mailed Dec. 14, 2011.
European Search Report in commonly owned European Application No. 09180634 dated Feb. 2, 2010, pp. 1-3.
European Search Report in commonly owned European Application No. 10196806 dated Apr. 27, 2011, pp. 1-5.
Search Report in commonly owned European Patent Application No. EP 01 27 4302 dated Mar. 4, 2005, pp. 1-4.
Office Action in commonly owned U.S. Appl. No. 11/768,592 mailed Apr. 8, 2009, pp. 1-9.
Notice of Allowance in commonly owned U.S. Appl. No. 11/647,101 mailed Dec. 29, 2008, pp. 1-7.
International Search Report in commonly owned International Application No. PCT/KR2006/005752, dated Mar. 27, 2007, pp. 1-2.
International Search Report dated Jul. 14, 2005 in commonly owned international publication No. PCT/KR2004/003457, pp. 1.
International Preliminary Report on Patentability dated Jan. 25, 2007 in commonly owned international publication No. PCT/KR2004/003457, pp. 1-23.
International Search Report in commonly owned International Application No. PCT/KR2008/007157, dated May 28, 2009, pp. 1-2.
Office Action in commonly owned U.S. Appl. No. 12/792,176 mailed Nov. 16, 2011, pp. 1-12.
International Search Report in commonly owned International Application No. PCT/KR2008/007825, dated Aug. 28, 2009, pp. 1-2.
Office Action in commonly owned U.S. Appl. No. 12/880,209 mailed Feb. 16, 2011, pp. 1-10.
Final Office Action in commonly owned U.S. Appl. No. 12/880,209 mailed Jul. 29, 2011, pp. 1-9.
Advisory Action in commonly owned U.S. Appl. No. 12/880,209 mailed Nov. 4, 2011, pp. 1-4.
International Search Report in commonly owned International Application No. PCT/KR2008/007820 dated Jul. 28, 2009, pp. 1-2.
Office Action in commonly owned U.S. Appl. No. 12/817,302 mailed Mar. 29, 2012, pp. 1-5.
Final Office Action in commonly owned U.S. Appl. No. 12/642,904 mailed Mar. 27, 2012, pp. 1-7.
European Search Report in commonly owned European Application No. 08873425.6 dated May 29, 2012, pp. 1-5.
Office Action in commonly owned U.S. Appl. No. 12/884,549 mailed Aug. 21, 2012, pp. 1-12.
Final Office Action in commonly owned U.S. Appl. No. 12/792,176 mailed Apr. 19, 2012, pp. 1-10.
Advisory Action in commonly owned U.S. Appl. No. 12/792,176 mailed Aug. 23, 2012, pp. 1-4.
Office Action in commonly owned U.S. Appl. No. 12/972,795 mailed Jan. 18, 2013, pp. 1-9.
Notice of Allowance in commonly owned U.S. Appl. No. 12/642,904 mailed Jul. 2, 2012, pp. 1-8.
European Search Report in commonly owned European Application No. 08873329.0 dated Dec. 14, 2012, pp. 1-7.
Final Office Action in commonly owned U.S. Appl. No. 12/817,302 mailed Feb. 7, 2013, pp. 1-6.
Final Office Action in commonly owned U.S. Appl. No. 12/884,549 mailed Dec. 18, 2012, pp. 1-7.
Notice of Allowance in commonly owned U.S. Appl. No. 12/884,549 mailed Apr. 11, 2013, pp. 1-8.
Advisory Action in commonly owned U.S. Appl. No. 12/817,302 mailed May 16, 2013, pp. 1-5.
Notice of Allowance in commonly owned U.S. Appl. No. 12/972,795 mailed May 24, 2013, pp. 1-8.
European Search Report for commonly owned European Application No. EP 04808586, completed on Sep. 25, 2007.
English-translation of Chinese Office Action in counterpart Chinese Application No. 200880128614.0 dated Mar. 7, 2012, pp. 1-2.
European Search Report in commonly owned European Application No. 07024808, dated Mar. 18, 2008, pp. 1-2.
Machine Translation of JP 10-017762, No date.
Derwent Abstract of JP 2002348457 (A) (2003).
Full English Translation of JP-10-017762 (2011).
Office Action in commonly owned Application U.S. Appl. No. 12/898,012 mailed Dec. 21, 2012, pp. 1-6.
International Search Report in commonly owned International Application No. PCT/KR2008/007838 mailed Aug. 18, 2009.
European Search Report in commonly owned European Application No. 10194938.6 dated Jul. 21, 2011, pp. 1-5.
Notice of Allowance in commonly owned U.S. Appl. No. 12/961,877 mailed Jun. 19, 2013, pp. 1-10.
Final Office Action in commonly owned U.S. Appl. No. 12/961,877 mailed Nov. 28, 2012, pp. 1-10.
Advisory Action in commonly owned U.S. Appl. No. 12/961,877 mailed Mar. 12, 2013, pp. 1-2.
Office Action in commonly owned U.S. Appl. No. 12/961,877 mailed Jul. 30, 2012, pp. 1-14.
Office Action in commonly owned U.S. Appl. No. 12/971,333 mailed Aug. 27, 2012, pp. 1-12.
Final Office Action in commonly owned U.S. Appl. No. 12/971,333 mailed Dec. 10, 2012, pp. 1-11.
Notice of Allowance in commonly owned U.S. Appl. No. 12/971,333 mailed Mar. 27, 2013, pp. 1-9.

(56) References Cited

OTHER PUBLICATIONS

Office Action in commonly owned U.S. Appl. No. 12/971,333 mailed Jul. 11, 2013, pp. 1-7.
Notice of Allowance in commonly owned U.S. Appl. No. 12/880,209 mailed Oct. 10, 2013, pp. 1-10.
Notice of Allowance in commonly owned U.S. Appl. No. 12/817,302 mailed Oct. 1, 2013, pp. 1-7.
Office Action in commonly owned U.S. Appl. No. 12/898,012 mailed Oct. 1, 2013, pp. 1-6.

* cited by examiner

POLYCARBONATE RESIN COMPOSITION WITH IMPROVED TRANSPARENCY AND SCRATCH-RESISTANCE

CROSS REFERENCE TO RELATED APPLICATIONS

This application claims priority from Korean Patent Application No. 2008-0128435, filed Dec. 17, 2008 in the Korean Intellectual Property Office, the disclosure of which is incorporated herein by reference in its entirety.

FIELD OF THE INVENTION

The present invention relates to polycarbonate resin composition with improved transparency and scratch-resistance.

BACKGROUND OF THE INVENTION

Thermoplastic resins have a lower specific gravity than glass or metal and excellent properties such as moldability and impact resistance. Plastic resins have been widely used in various products such as automobiles and electrical/electronic appliances as a substitute for glass or metal to lower costs, scale up production, reduce weight, and the like. For this reason, the function and appearance of thermoplastic resins used in housings are increasingly important, and scratch resistance and flame resistance are also increasingly required.

Polycarbonate (PC) resin can have excellent impact resistance, thermal stability, self-extinguishing properties and dimensional stability as well as excellent mechanical strength and flame resistance. Therefore polycarbonate resin is used to manufacture various products such as automobiles and electrical/electronic appliances, among others. Moreover, glass in products that require both impact resistance and transparency such as lens can be substituted with polycarbonate resin. However, polycarbonate has low scratch resistance.

Acrylic resins, especially polymethyl methacrylate (PMMA) resin, can have excellent transparency, weather resistance, mechanic strength, surface gloss, adhesion, and scratch resistance. Acrylic resins, however, can have poor impact resistance and flame resistance.

One method to improve scratch resistance of a resin surface includes hardening an inorganic or organic hybrid material on the surface of a final molded resin using heat or ultraviolet light. However, this method can increase costs, cause pollution problems and increase processing times because of the additional coating step. Accordingly, there is increasingly a need for a non-coated resin exhibiting scratch resistance. Moreover, development of a resin with excellent scratch resistance is very important for the housing industry.

One method for preparing a resin having both scratch resistance and flame resistance that also addresses the above problems is preparing a PC/PMMA resin by mixing polycarbonate and acrylic resin, preferably polymethyl methacrylate (PMMA). However, the PC/PMMA alloy is difficult to color, has poor transparency and forms a distinct melt joint during injection because the PC/PMMA alloy diffuses light and has high chroma due to the difference between the refractive indices of PC and PMMA. Moreover, the composition can exhibit phase separation during melt mixing at a high temperature due to low compatibility between PC and PMMA.

KR Patent No. 2004-79118 discloses reducing the molecular weight of polycarbonate during mixing using metal stearic acid ester to improve the compatibility between PC and PMMA. However, the blend of polycarbonate and methacrylate resin has limited transparency.

Generally, when the molecular weight of a resin is reduced in an alloy of resins with low compatibility, compatibility tends to increase. Therefore, if the molecular weight of PMMA is low, compatibility with PC tends to improve, but transparency is not expected due to phase separation and haze on the surface due to the difference between the refractive indices of the PMMA and PC.

SUMMARY OF THE INVENTION

The present invention provides a polycarbonate resin composition that can have improved transparency.

The present invention also provides a polycarbonate resin composition that can have excellent transparency and scratch resistance.

The present invention further provides a polycarbonate resin composition that may not exhibit phase separation during melt mixing (kneading) at a high temperature.

The present invention further provides a polycarbonate resin composition that can have excellent mechanical properties, moldability and easy colorability.

The present invention also provides a polycarbonate resin composition that can be used in the manufacture of electrical and electronic components, automobile parts, lens, windows, and the like, due to its excellent scratch-resistance, transparency, fluidity, appearance and easy colorability.

The present invention further provides a molded article that can have a good appearance without a flow mark formed during an extrusion process using the polycarbonate resin composition.

The present invention provides a polycarbonate resin composition that can have excellent compatibility, transparency and scratch-resistance by mixing a polycarbonate resin with an acrylic copolymer having an ultra-low molecular weight and a high refractive index.

Other aspects and advantages of this invention will be apparent from the ensuing disclosure and appended claims.

According to one aspect of the present invention, the present invention provides a polycarbonate resin composition including a polycarbonate (A) and an acrylic copolymer with an ultra-low molecular weight and a high refractive index (B). In an exemplary embodiment of the present invention, the resin composition comprises about 10 to about 99% by weight of a polycarbonate resin (A) and about 1 to about 90% by weight of an acrylic copolymer with an ultra-low molecular weight and a high refractive index (B). In another embodiment of the present invention, the resin composition may further comprise an acrylic resin (C). The polycarbonate resin composition may include the acrylic resin (C) in an amount of less than about 89% by weight.

In an exemplary embodiment of the present invention, the acrylic copolymer with an ultra-low molecular weight and a high refractive index (B) may have a weight average molecular weight of about 3,000 to about 40,000 g/mol and a refractive index of about 1.495 to about 1.590.

In one exemplary embodiment of the present invention, the acrylic copolymer with an ultra-low molecular weight and a high refractive index (B) may comprise a mixture or a copolymer comprising about 5 to about 100% by weight of an aromatic or aliphatic methacrylate and about 0 to about 95% by weight of a multifunctional unsaturated monomer. Examples of the multifunctional unsaturated monomer may include without limitation methacrylic acid esters, acrylic acid esters, unsaturated carboxylic acids, acid anhydrides, hydroxyl group containing esters, acrylamide, methacrylamide and the like, and combinations thereof.

The polycarbonate resin (A) may be a linear polycarbonate resin, a branched polycarbonate resin, a polyester-carbonate copolymer resin or a combination thereof.

In an exemplary embodiment of the present invention, the acrylic resin (C) may have a weight average molecular weight of about 3,000 to about 40,000. The acrylic resin (C) may comprise a mixture or a copolymer of acrylic monomers such as but not limited to methyl methacrylate, ethyl methacrylate, propyl methacrylate, butyl methacrylate, hexyl methacrylate, 2-ethylhexyl methacrylate, methyl acrylate, ethyl acrylate, propyl acrylate, butyl acrylate, 2-ethylhexyl acrylate and the like, and combinations thereof.

In an exemplary embodiment of the present invention, the polycarbonate resin composition may have a scratch width of about 180 μm to about 340 μm measured by the Ball-type Scratch Profile (BSP) test and a pencil hardness of 2 B to 3 H.

In another exemplary embodiment of the present invention, the polycarbonate resin composition may have a haze (Hz) of less than about 95% measured with a haze meter using a sample having a width of 2.5 mm and a total light transmittance (TT) of more than about 10%.

Another aspect of the present invention is a molded article formed of the polycarbonate resin composition.

BRIEF DESCRIPTION OF THE DRAWINGS

FIG. 1($a$) is a TEM image showing the phase transition of Example 2; FIG. 1($b$) is a TEM image showing the phase transition of Comparative Example 3; and FIG. 1($c$) is a TEM image showing the phase transition of Comparative Example 4.

FIG. 2($a$) is a scratch profile of Example 2 measured by a BSP test; and FIG. 2($b$) is a scratch profile of Comparative Example 6 measured a by BSP test.

DETAILED DESCRIPTION OF THE INVENTION (A) Polycarbonate Resin

In an exemplary embodiment of the present invention, the polycarbonate resin can be prepared by reacting phosgene with a dihydric phenol compound in the presence of a catalyst and a molecular weight control agent according to known methods. In another exemplary embodiment of the present invention, the polycarbonate resin can be prepared by transesterification of a dihydric phenol compound and a carbonate precursor such as diphenyl carbonate.

A bisphenol compound may be used as the dihydric phenol compound, for example, 2,2-bis(4-hydroxyphenyl)propane (bisphenol A). The bisphenol A can be partially or totally substituted by another dihydric phenol compound. Examples of other kinds of dihydric phenol compounds may include without limitation halogenated bisphenol, hydroquinone, 4,4'-hydroxydiphenyl, bis(4-hydroxydiphenyl)methane, 1,1-bis(4-hydroxydiphenyl)cyclohexane, 2,2-bis(3,5-dimethyl-4-hydroxydiphenyl)propane, bis(4-hydroxydiphenyl)sulfide, bis(4-hydroxydiphenyl)sulfone, bis(4-hydroxydiphenyl)sulfoxide, bis(4-hydroxydiphenyl)ketone, bis(4-hydroxydiphenyl)ether, 2,2-bis(3,5-dibromo-4-hydroxydiphenyl)propane and the like, and combinations thereof. The kinds of dihydric phenol compounds used to prepare the polycarbonate resin are not limited.

The polycarbonate resin may be a homopolymer prepared using one kind of dihydric phenol compound, a copolymer prepared using two or more kinds of dihydric phenol compounds, or a combination thereof.

The polycarbonate resin may also be a linear polycarbonate resin, a branched polycarbonate resin, a polyester-carbonate copolymer resin, or a combination thereof.

The linear polycarbonate resin may be prepared using bisphenol A. The branched polycarbonate resin may be prepared by reacting a multifunctional aromatic compound such as trimellitic anhydride or trimellitic acid with a carbonate precursor. The polyester-carbonate copolymer resin may be prepared by reacting a difuctional carboxylic acid with a dihydric phenol compound and carbonate precursor.

In the present invention, the polycarbonate resin may be used alone or as a combination thereof, including combinations of polycarbonate resins having different molecular weights.

In an exemplary embodiment of the present invention, the polycarbonate resin may have a weight average molecular weight (Mw) of about 10,000 to about 50,000 g/mol, for example about 15,000 to about 45,000 g/mol.

In the present invention, the polycarbonate resin composition may include the polycarbonate resin in an amount of about 10 to about 99% by weight, for example about 30 to about 95% by weight, as another example about 50 to about 93% by weight, and as another example about 70 to about 90% by weight. If the polycarbonate resin is used in an amount of less than about 10% by weight, it may be difficult to provide the excellent mechanical properties of the polycarbonate. If the polycarbonate resin is used in an amount of more than about 99% by weight, it may be difficult to improve scratch-resistance. Moreover, compatibility and transparency may be improved when the polycarbonate resin composition includes the polycarbonate resin in an amount of about 10 to about 99% by weight.

(B) Acrylic Copolymer with Ultra-Low Molecular Weight and High Refractive Index

The acrylic copolymer with an ultra-low molecular weight and a high refractive index (B) of the present invention may have a weight average molecular weight of about 3,000 to about 40,000 g/mol. If the weight average molecular weight is higher than about 40,000 g/mol, phase separation may result even using a high refractive index acrylic copolymer and it may be difficult to provide high transparency. In one exemplary embodiment of the present invention, the acrylic copolymer with an ultra-low molecular weight and a high refractive index (B) may have a weight average molecular weight of about 3,000 to about 10,000 g/mol. In another exemplary embodiment of the present invention, the acrylic copolymer with an ultra-low molecular weight and a high refractive index (B) may have a weight average molecular weight of about 10,000 to about 20,000 g/mol. In another exemplary embodiment of the present invention, the acrylic copolymer with an ultra-low molecular weight and a high refractive index (B) may have a weight average molecular weight of about 20,000 to about 30,000 g/mol. In another exemplary embodiment of the present invention, the acrylic copolymer with an ultra-low molecular weight and a high refractive index (B) may have a weight average molecular weight of about 30,000 to about 40,000 g/mol. In another exemplary embodiment of the present invention, the acrylic copolymer (B) may include a combination of two or more kinds of acrylic copolymers (B).

The acrylic copolymer (B) may have a refractive index of about 1.495 to about 1.590, for example about 1.510 to about 1.590, and as another example about 1.510 to about 1.570.

The acrylic copolymer (B) may be prepared by copolymerizing an aromatic or aliphatic methacrylate (b1) and a multifunctional unsaturated monomer (b2). In an exemplary embodiment of the present invention, the acrylic copolymer (B) may be a copolymer comprising about 5 to about 100% by weight of an aromatic or aliphatic methacrylate and about 0 to about 95% by weight of a multifunctional unsaturated monomer. In another exemplary embodiment of the present invention, the acrylic copolymer (B) may be a copolymer comprising about 50 to about 90% by weight of an aromatic or aliphatic methacrylate and about 10 to about 50% by weight of a multifunctional unsaturated monomer. In another exemplary embodiment of the present invention, the acrylic copolymer (B) may be a copolymer comprising about 10 to about 45% by weight of an aromatic or aliphatic methacrylate and about 55 to about 90% by weight of a multifunctional unsaturated monomer.

Moreover, the acrylic copolymer (B) may include a combination of two or more kinds thereof.

The aromatic or aliphatic methacrylate (b1) may be represented by the following Chemical Formula 1, Chemical Formula 2, or a combination thereof:

[Chemical Formula 1]

wherein m is an integer from 0 to 10 and X is cyclohexyl, phenyl, methylphenyl, methylethylphenyl, propylphenyl, methoxyphenyl, cyclohexylphenyl, chlorophenyl, bromophenyl, phenylphenyl or benzylphenyl.

[Chemical Formula 2]

wherein m is an integer from 0 to 10, Y is oxygen (O) or sulfur (S), and Ar is cyclohexyl, phenyl, methylphenyl, methylethylphenyl, propylphenyl, methoxyphenyl, cyclohexylphenyl, chlorophenyl, bromophenyl, phenylphenyl or benzylphenyl.

Examples of the aromatic or aliphatic methacrylate may include without limitation cyclohexyl methacrylate, phenoxy methacrylate, 2-ethylphenoxy methacrylate, benzyl methacrylate, phenyl methacrylate, 2-ethylthiophenyl methacrylate, 2-phenylethyl methacrylate, 3-phenylpropyl methacrylate, 4-phenylbutyl methacrylate, 2-2-methylphenylethyl methacrylate, 2-3-methylphenylethyl methacrylate, 2-4-methylphenylethyl methacrylate, 2-(4-propylphenyl)ethyl methacrylate, 2-(4-(1-methylethyl)phenyl)ethyl methacrylate, 2-(4-methoxyphenyl)ethyl methacrylate, 2-(4-cyclohexylphenyl)ethyl methacrylate, 2-(2-chlorophenyl)ethyl methacrylate, 2-(3-chlorophenyl)ethyl methacrylate, 2-(4-chlorophenyl)ethyl methacrylate, 2-(4-bromophenyl)ethyl methacrylate, 2-(3-phenylphenyl)ethyl methacrylate, 2-(4-benzylphenyl)ethyl methacrylate, and the like, and combinations thereof.

Examples of the multifunctional unsaturated monomer may include without limitation methacrylic acid ester, acrylic acid ester, unsaturated carboxylic acid, acid anhydride, hydroxyl group containing ester, acrylamide, methacrylamide and the like, and combinations thereof. For example, the multifunctional unsaturated monomer may include without limitation methacrylic acid ester such as methyl methacrylate, ethyl methacrylate, propyl methacrylate, butyl methacrylate and benzyl methacrylate, acrylic acid ester such as methyl acrylate, ethyl acrylate, propyl acrylate, butyl acrylate and 2-ethylhexyl acrylate, unsaturated carboxylic acid such as acrylic acid and methacrylic acid, acid anhydride such as maleic acid anhydride, hydroxyl group containing ester such as 2-hydroxyethyl acrylate, 2-hydroxypropyl acrylate and monoglycerol acrylate, acrylamide, methacrylamide and the like, and combinations thereof.

The acrylic copolymer with an ultra-low molecular weight and a high refractive index of the present invention may be prepared by copolymerizing about 5 to about 100% by weight of an aromatic or aliphatic methacrylate represented by Chemical Formula 1, Chemical Formula 2, or a combination thereof and about 0 to about 95% by weight of a multifunctional unsaturated monomer. If the amount of the aromatic or aliphatic methacrylate is less than about 5% by weight, the average refractive index of the acrylic copolymer with an ultra-low molecular weight can be less than about 1.495. The acrylic copolymer with a high refractive index can be prepared by known methods such as emulsion polymerization, suspension polymerization or bulk polymerization.

The acrylic copolymer with an ultra-low molecular weight and a high refractive index may be a (co)polymer of one or more aromatic or aliphatic methacrylates having a structure of Chemical Formula 1, Chemical Formula 2, or a combination thereof; a copolymer of aromatic or aliphatic methacrylate having a structure of Chemical Formula 1, Chemical Formula 2, or a combination thereof and a multifunctional unsaturated monomer; or a combination thereof.

The copolymer prepared by above method may have a higher refractive index than a typical acrylic copolymer. The acrylic copolymer with a high refractive index of the present invention may have a refractive index of about 1.495 to about 1.590 as compared to the refractive index of a typical polycarbonate of about 1.590 and the refractive index of polymethyl methacrylate of about 1.490.

In the present invention, the polycarbonate resin composition may include the acrylic copolymer with an ultra-low molecular weight and a high refractive index (B) in an amount of about 1 to about 90% by weight, for example about 5 to about 70% by weight and as another example about 10 to about 40% by weight. If the acrylic copolymer with an ultra-low molecular weight and a high refractive index (B) is used in amount of less than about 1% by weight, scratch resistance may not be sufficiently improved, and if the acrylic copolymer with an ultra-low molecular weight and a high refractive index (B) is used in amount of more than about 90% by weight, impact strength and mechanical properties may be reduced.

(C) Acrylic Resin

The acrylic resin (C) of the present invention may be prepared by polymerizing one or more acrylic monomers. The acrylic resin (C) may be a linear structure having a weight average molecular weight of about 3,000 to about 40,000 g/mol, which can provide excellent compatibility and excellent transparency. In one exemplary embodiment of the present invention, the acrylic resin (C) may have a weight average molecular weight of about 3,000 to about 15,000 g/mol, for example about 15,000 to about 40,000 g/mol.

Examples of the acrylic monomers may include without limitation methyl methacrylate, ethyl methacrylate, n-propyl methacrylate, n-butyl methacrylate, hexyl methacrylate, 2-ethylhexyl methacrylate, methyl acrylate, ethyl acrylate, propyl acrylate, butyl acrylate, 2-ethylhexyl acrylate and the like. The acrylic monomers can be used alone or in combination with one another.

The acrylic resin (C) can be prepared by known methods such as emulsion polymerization, suspension polymerization or bulk polymerization.

The acrylic resin (C) may be a homopolymer prepared using one kind of acrylic monomer, a copolymer prepared using two or more kinds of acrylic monomers, or a combination thereof.

In the present invention, the acrylic resin (C) may be an optional component. The polycarbonate resin composition may include the acrylic resin (C) in an amount of about 0 to about 89% by weight, for example of about 5 to about 70% by weight and as another example of about 5 to about 50% by weight based on about 100% by weight of a base resin including the polycarbonate resin (A) and the acrylic copolymer (B). If the acrylic resin (C) is used in an amount of more than about 89% by weight, impact strength and mechanical properties may be reduced.

Blending the polycarbonate resin (A) with the acrylic copolymer with an ultra-low molecular weight and a high refractive index (B) and optionally the acrylic resin (C) instead of a typical acrylic resin can improve compatibility due to reduced differences in refractive index and independent domains of polycarbonate and acrylic resin may not be observed because of the improved compatibility. Moreover, a polycarbonate resin with excellent transparency can be prepared because phase separation may be minimized during melt mixing (kneading) at high temperature. Transparency of the polycarbonate resin composition of the present invention can be similar to the transparency of a polycarbonate alone.

Moreover, the polycarbonate resin composition may have excellent scratch resistance and transparency due to the acrylic copolymer, and fluidity may be improved by using the copolymer with an ultra-low molecular weight and a high scratch resistance as compared to a resin composition with the same amount of a conventional or typical acrylic resin. Further, similar scratch resistance can be provided when a reduced amount of the acrylic copolymer is used, as well as improved properties such as impact strength.

In an exemplary embodiment of the present invention, the polycarbonate resin composition may have a scratch width of about 180 to about 340 µm, for example about 180 to about 310 µm, and as another example about 180 to about 290 µm, measured by the Ball-type Scratch Profile and a pencil hardness of 2 B to 3 H.

Moreover, the polycarbonate resin composition may have a haze (Hz) of less than about 95% measured with a haze meter using a sample having a width of 2.5 mm and a total light transmittance (TT) of more than about 10%. In another exemplary embodiment of the present invention, the polycarbonate resin composition may have a haze (Hz) of less than about 70% and a total light transmittance (TT) of more than about 40%. In another exemplary embodiment of the present invention, the polycarbonate resin composition may have a haze (Hz) of less than about 50% and a total light transmittance (TT) of more than about 50%. In another exemplary embodiment of the present invention, the polycarbonate resin composition may have a haze (Hz) of less than about 30% and a total light transmittance (TT) of more than about 60%. In another exemplary embodiment of the present invention, the polycarbonate resin composition may have a haze (Hz) of less than about 7% and a total light transmittance (TT) of more than about 75%.

The resin composition of the invention may further comprise one or more additives such as flame retarders, surfactants, nucleating agents, coupling agents, filler, light-stabilizers, reinforcers, antistatic agents, antibacterial agents, mold lubricants, heat stabilizers, antioxidants, light stabilizers, compatibilizers, inorganic additives, fluorescent brightening agents, stabilizers, lubricants, antistatic agents, pigments, dyes, flame retardants, and the like. The additives may be used alone or in combination with one another.

The resin composition can be prepared by known methods. For example, a resin composition of the present invention may be prepared in the form of pellets by mixing the aforementioned components with optional additives and melt-extruding the composition in an extruder. The prepared pellets may be used in various molding techniques such as but not limited to injection molding and extrusion molding.

In another aspect of the present invention, there is provided a molded article obtained by molding the aforementioned resin composition. The molded article may be used in articles requiring transparency, scratch resistance and mechanical strength since the polycarbonate resin composition of the present invention can have excellent scratch resistance, appearance, coloration, moldability and mechanical strength. As non-limiting examples, the molded article may be used in a wide range of products such as but not limited to exterior materials or parts for electronic products, parts for automobiles, construction materials, interior articles, toys and house hold goods.

The invention may be better understood by reference to the following examples which are intended for the purpose of illustration and are not to be construed as in any way limiting the scope of the present invention, which is defined in the claims appended hereto.

EXAMPLES

The components used in the Examples and Comparative Examples will be described more fully hereinafter.

(A) Polycarbonate Resin

Bisphenol-A based linear polycarbonate having a weight average molecular weight of 25,000 g/mol made by Teijin Chemicals Ltd. of Japan (product name: PANLITE L-1250 WP) is used.

(B) Acrylic Copolymer Resin with Ultra-Low Molecular Weight and High Refractive Index (B1) Acrylic Copolymer Resin with Ultra-Low Molecular Weight and High Refractive Index An acrylic copolymer resin having a refractive index of 1.530 and a molecular weight of 25,000 g/mol is prepared by a conventional suspension polymerization using 50% by weight of phenyl methacrylate monomer with a refractive index of 1.570 and 50% by weight of methyl methacrylate.

(B2) Acrylic Copolymer Resin with Ultra-Low Molecular Weight and High Refractive Index An acrylic copolymer resin having a refractive index of 1.530 and a molecular weight of 25,000 g/mol is prepared by a conventional suspension polymerization using 50% by weight of methyl methacrylate monomer and 50% by weight of phenyl methacrylate monomer with a refractive index of 1.570.

(B3) Acrylic Copolymer Resin with Ultra-Low Molecular Weight and High Refractive Index An acrylic copolymer resin having a refractive index of 1.530 and a molecular weight of 35,000 g/mol is prepared by a conventional suspension polymerization using 50% by weight of methyl methacrylate monomer and 50% by weight of phenyl methacrylate monomer with a refractive index of 1.570.

(B4) Acrylic Copolymer Resin with Ultra-Low Molecular Weight and High Refractive Index An acrylic copolymer resin having a refractive index of 1.530 and molecular weight of 15,000 g/mol is prepared by a conventional suspension polymerization using 50% by weight of methacrylate monomer, 20% by weight of benzyl methacrylate and 30% by weight of phenyl methacrylate monomer with a refractive index of 1.570.

(C) Acrylic Resin

An acrylic polymer having a molecular weight of 15,000 g/mol is prepared by a conventional suspension polymerization using 100% by weight of methyl methacrylate monomer.

(D) Acrylic Copolymer with High Refractive Index (D1) Acrylic Copolymer With High Refractive Index An acrylic copolymer with a high refractive index having a weight average molecular weight of 80,000 g/mol and a refractive index of 1.530 is prepared by a conventional suspension polymerization using 50% by weight of methacrylate monomer and 50% by weight of phenyl methacrylate monomer with a refractive index of 1.570.

(D2) Acrylic Copolymer with High Refractive Index

An acrylic copolymer with a high refractive index having a weight average molecular weight of 130,000 g/mol and a refractive index of 1.530 is prepared by a conventional suspension polymerization using 50% by weight of methacrylate monomer and 50% by weight of phenyl methacrylate monomer with a refractive index of 1.570.

(E) Acrylic Resin

An acrylic resin having a weight average molecular weight of 92,000 g/mol made by LG MMA (product name: L84) is used as an example of a conventional acrylic resin.

Examples 1 to 7

The components as shown in the following Table 1 are added to a conventional mixer, 0.1 parts by weight of hindered phenolic heat stabilizer are added to the mixture and the mixture is melt mixed and extruded through a twin screw extruder (L/D=29, Φ=45 mm) to prepare pellets. After drying the produced pellets at 80° C. for 6 hours, samples having a size of L 90 mm×W 50 mm×t2.5 mm are prepared by injecting the dried pellets using a 6-Oz injector.

Comparative Example 1

Comparative Example 1 is prepared in the same manner as in Example 2 except that the acrylic copolymer resin with ultra-low molecular weight and high refractive index (B) is replaced with the acrylic resin with low molecular weight (C).

Comparative Example 2

Comparative Example 2 is prepared in the same manner as in Example 2 except that the acrylic copolymer resin with ultra-low molecular weight and high refractive index (B) is replaced with the acrylic copolymer resin with high refractive index (D1) having a weight average molecular weight of 80,000 g/mol.

Comparative Example 3

Comparative Example 3 is prepared in the same manner as in Example 2 except that the acrylic copolymer resin with ultra-low molecular weight and high refractive index (B) is replaced with the acrylic copolymer resin with high refractive index (D2) having a weight average molecular weight of 130,000 g/mol.

Comparative Example 4

Comparative Example 4 is prepared in the same manner as in Example 2 except that the acrylic copolymer resin with ultra-low molecular weight and high refractive index (B) is replaced with the acrylic resin (E) having a weight average molecular weight of 92,000 g/mol.

Comparative Example 5

Comparative Example 5 is prepared in the same manner as in Example 1 except that the acrylic copolymer resin with ultra-low molecular weight and high refractive index (B) is replaced with the acrylic resin (E) having a weight average molecular weight of 80,000 g/mol.

Comparative Example 6

Polycarbonate is used without acrylic resin.

(1) Compatibility: Compatibility is measured by the existence and nonexistence of a flow mark on the surface as determined by the naked eye, and phase separation movement is confirmed through a Transmission Electron Microscope (TEM) image.

(2) Transparency: Total light transmittance (TT) and Haze value are measured by a Haze meter NDH 2000 device by Nippon Denshoku. Total light transmittance is calculated by the quantity of light in total of diffusion light transmittance (DT) and parallel light transmittance (PT), and Haze value (%) is calculated by diffusion light transmittance (DT)/parallel light transmittance (PT).

(3) Melt flow index: Melt flow index (g/10 min) is measured at 200° C., 10 kg according to ASTM D-1238 and the result is represented in the following Table 1.

Figure 2A:
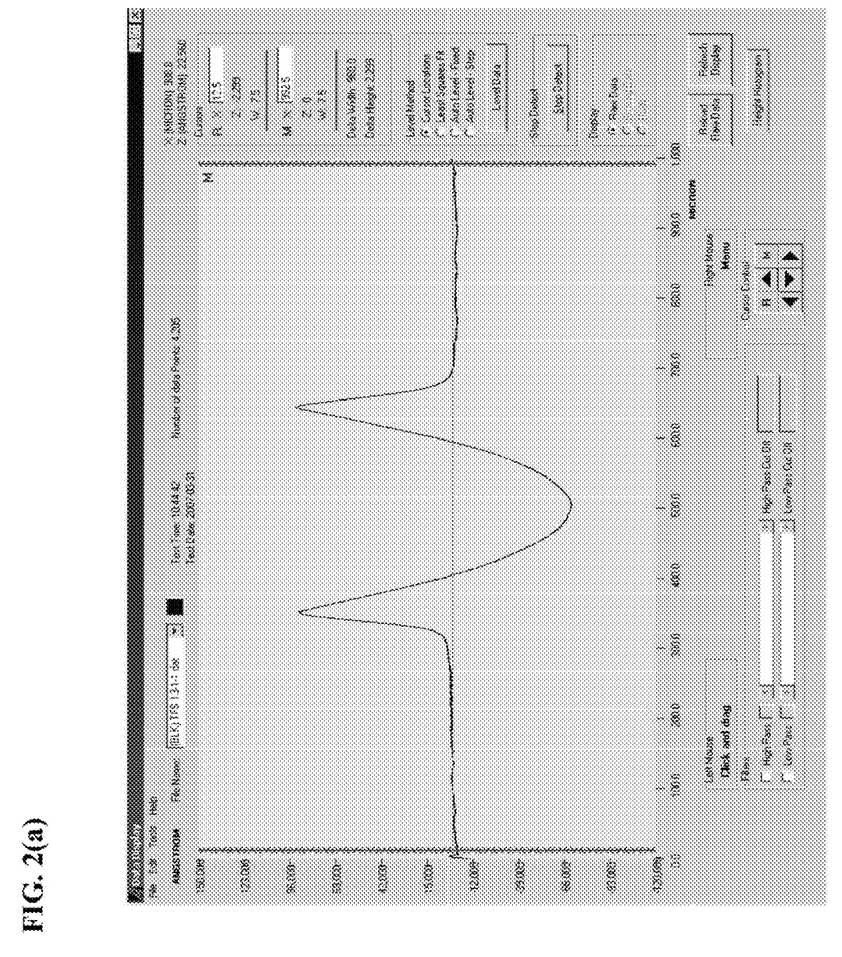
Figure 2B:
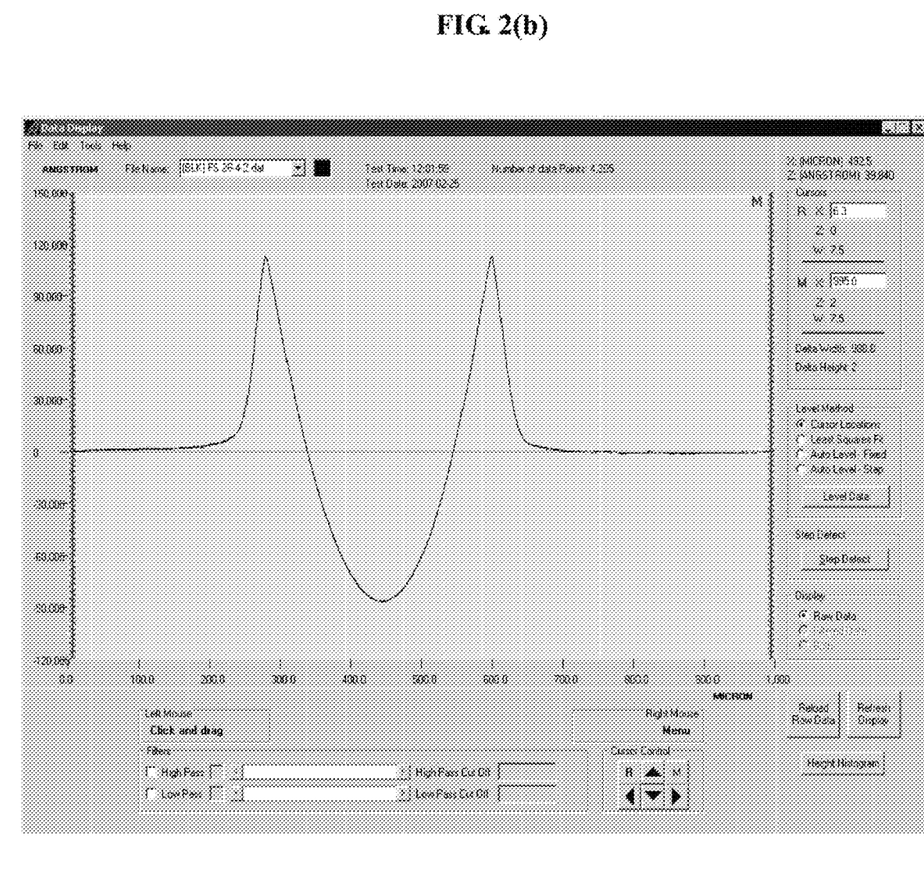

(4) Scratch Resistance:

(4.1) BSP (Ball-type Scratch Profile) test: The BSP is conducted by forming a scratch of a length of 10 to 20 mm on the resin sample at a load of 1,000 g and a scratch speed of 75 mm/min, using a metal spherical tip with a diameter of 0.7 mm and measuring a profile of the applied scratch using a surface profile analyzer (XP-T) having a metal stylus tip with a diameter of 2 μm. The scratch resistance is evaluated from the scratch width (μm) of the measured profile. As the measured scratch width decreases, the scratch resistance increases. Measured scratch profile images of Example 2 and Comparative Example 6 are represented in FIG. 2.

(4.2) Pencil hardness: Pencil hardness is measured at a load of 500 g according to ASTM D-3362, and the result is represented in the following Table 1. As the hardness increases, the scratch resistance increases, and as the blackness increases, the scratch resistance decreases.

TABLE 1

| | | Examples | | | | | | | Comparative Examples | | | | | |
|---|---|---|---|---|---|---|---|---|---|---|---|---|---|---|
| | | 1 | 2 | 3 | 4 | 5 | 6 | 7 | 1 | 2 | 3 | 4 | 5 | 6 |
| (A) | | 90 | 80 | 90 | 80 | 80 | 80 | 80 | 80 | 80 | 80 | 80 | 90 | 100 |
| (B) | (B1) | 10 | 20 | — | — | — | — | 10 | — | — | — | — | — | — |
| | (B2) | — | — | 10 | 20 | — | — | — | — | — | — | — | — | — |
| | (B3) | — | — | — | — | 20 | — | — | — | — | — | — | — | — |
| | (B4) | — | — | — | — | — | 20 | — | — | — | — | — | — | — |
| (C) | | — | — | — | — | — | — | 10 | 20 | — | — | — | — | — |
| (D) | (D1) | — | — | — | — | — | — | — | — | 20 | — | — | — | — |
| | (D2) | — | — | — | — | — | — | — | — | — | 20 | — | — | — |
| (E) | | — | — | — | — | — | — | — | — | — | — | 20 | 10 | — |
| Flow Mark | | X | X | X | X | X | X | X | X | X | X | ○ | ○ | X |
| Haze (HZ) | | 1.0 | 1.2 | 1.0 | 1.4 | 5.9 | 1.5 | 6.4 | 19.1 | 34.6 | 46.0 | 99.2 | 92.4 | 0.9 |
| Total light transmittance (TT) | | 87.8 | 86.4 | 87.4 | 85.2 | 79.8 | 85.1 | 77.7 | 63.0 | 67.1 | 54.5 | 9.6 | 32.0 | 87.6 |
| Melt flow index (MI) | | 3.13 | 6.05 | 2.92 | 5.4 | 4.52 | 7.5 | 5.98 | 5.8 | 2.45 | 2.24 | 2.19 | 1.67 | 0.99 |
| BSP | Width (μm) | 301 | 285.6 | 299.9 | 284 | 287.3 | 284.4 | 286 | 288 | 294.4 | 295 | 293 | 315 | 345 |
| Pencil hardness | | HB | F | HB | F | F | F | F | F | HB | HB | HB | B | 3B |

From the results shown in the above Table 1, it can be seen that Examples 1 to 7 employing the acrylic copolymer resin with ultra-low molecular weight and high refractive index (B) exhibit good transparency, as compared to Comparative Example 1 employing the acrylic resin with ultra-low molecular weight (C). Moreover, when polycarbonate and a typical amount of polymethylmethacrylate are mixed such as in Comparative Examples 4 and 5, scratch resistance is improved as compared to a resin including only carbonate. However, Comparative Examples 4 and 5 exhibit flow mark and opaque line appearance due to reduction of compatibility between the two resins which is confirmed by increased haze and decreased total light transmittance.

Comparative Examples 2 and 3 employing the acrylic copolymer resin with a high refractive index of about 1.495 to about 1.590 and a weight average molecular weight of more than 40,000 exhibit decreased haze and increased transmittance due to improved compatibility as compared to Comparative Example 4 which includes a typical acrylic resin with a low refractive index but exhibit insufficient transparency as compared to polycarbonate. As a result, it can be seen that compatibility is not enough to exhibit entire transparency.

When the acrylic copolymer resin with ultra-low molecular weight and high refractive index (B) is employed in Examples 1 to 6 of the present invention, the flow mark entirely disappears and transparency with regard to haze or total light transmittance is improved to a level approaching that exhibited by the Comparative Example including only polycarbonate. The result of improved total light transmittance, decreased haze and disappearing flow mark show that compatibility and transparency are improved as compared to Comparative Examples 4 and 5 having the same amount of acrylic resin.

Moreover, when the same amount of acrylic resin is employed, relatively high scratch resistance is exhibited and compatibility and fluidity are improved by including an ultra-low molecular weight acrylic resin. Comparing Example 2 with Comparative Example 4, Example 2 exhibits high scratch resistance due to improved compatibility and fluidity as compared to Comparative Example 4 employing the same amount of acrylic resin. This is also observed in Examples 4 and 5 which have different molecular weight components, and Examples 1 and 3 and Comparative Example 5 which have different amounts of the acrylic component.

Moreover, when the acrylic copolymer with ultra-low molecular weight of less than 40,000 and acrylic copolymer with ultra-low molecular weight and high refractive index are employed together such as Example 7, haze increases and transmittance decreases as compared to Example 2 employing only acrylic copolymer with ultra-low molecular weight and high refractive index, but high transparency and excellent scratch resistance are exhibited as compared to a composition including a typical amount of acrylic resin (Comparative Example 4) or acrylic copolymer with high refractive index (Comparative Examples 2 and 3).

Figure 1:
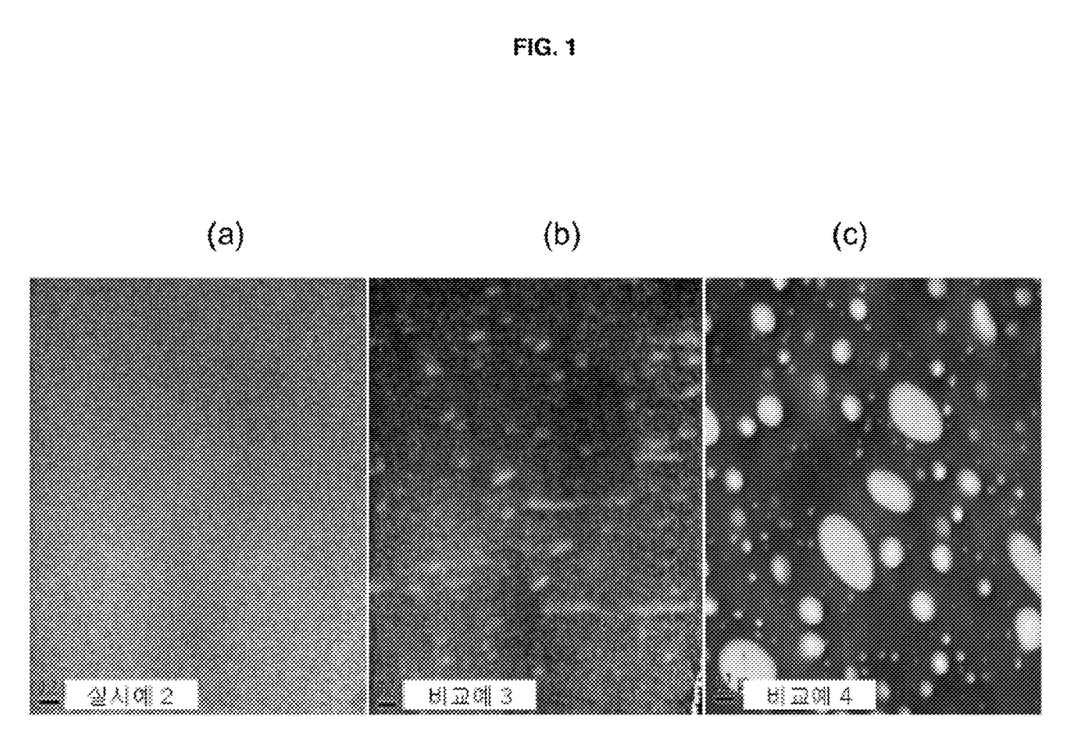

Improved compatibility between polycarbonate resin and acrylic resin is confirmed through TEM image. FIG. 1(c) is TEM image showing phase movement of Comparative Example 4. FIG. 1(c) shows phase separation with a relatively large domain of polymethyl methacrylate phase in a polycarbonate base due to decreased compatibility. FIG. 1(b) is TEM image showing phase movement of Comparative Example 3. FIG. 1(b) shows that the size of the polymethyl methacrylate phase is much smaller because compatibility is slightly improved by using acrylic resin with a high refractive index (D2), but the polymethyl methacrylate phase still remains. FIG. 1(a) is TEM image showing phase movement of Example 2 and shows that compatibility and transparency are improved by the homogeneous phase and disappearance of phase separation.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A polycarbonate resin composition having improved transparency and scratch resistance consisting essentially of:
   (A) about 10 to about 99% by weight of a polycarbonate resin;
   (B) about 1 to about 90% by weight of an acrylic polymer, copolymer, or mixture thereof with a high refractive index of about 1.495 to about 1.590 and a weight average molecular weight of 15,000 to 25,000 g/mol consisting essentially of:
(b1) about 5 to about 45% by weight of an aromatic methacrylate, aliphatic methacrylate or combination thereof represented by the following Chemical Formula 1, Chemical Formula 2, or a combination thereof, and
(b2) about 55 to about 95% by weight of a multifunctional unsaturated monomer, methacrylic acid ester, acrylic acid ester, or combination thereof,

[Chemical Formula 1]

wherein m is an integer from 0 to 10 and X is phenyl, methylphenyl, methylethylphenyl, propylphenyl, methoxyphenyl, cyclohexylphenyl, phenylphenyl or benzylphenyl

[Chemical Formula 2]

wherein m is an integer from 0 to 10, Y is oxygen (O) or sulfur (S), and Ar is cyclohexyl, phenyl, methylphenyl, methylethylphenyl, propylphenyl, methoxyphenyl, cyclohexylphenyl, chlorophenyl, bromophenyl, phenylphenyl or benzylphenyl;
optionally an acrylic resin (C) formed by polymerizing one or more monomers selected from the group consisting of methyl methacrylate, ethyl methacrylate, propyl methacrylate, butyl methacrylate, hexyl methacrylate, 2-ethylhexyl methacrylate, methyl acrylate, ethyl acrylate, propyl acrylate, butyl acrylate, 2-ethylhexyl acrylate, and combinations thereof; and
optionally one or more additives selected from the group consisting of flame retarders, surfactants, nucleating agents, coupling agents, fillers, light-stabilizers, reinforcers, antistatic agents, antibacterial agents, mold lubricants, heat stabilizers, antioxidants, light stabilizers, compatibilizers, inorganic additives, fluorescent brightening agents, stabilizers, lubricants, antistatic agents, pigments, dyes, flame retardants, and combinations thereof.

2. The polycarbonate resin composition of claim 1, wherein the polycarbonate resin composition has a haze (Hz) of 1.0 to 1.5% measured with a haze meter using a sample with a width of 2.5 mm.

3. The polycarbonate resin composition of claim 1, wherein said acrylic resin (C) is present in an amount of greater than 0 to about 89% by weight.

4. The polycarbonate resin composition of claim 3, wherein said acrylic resin (C) has a weight average molecular weight of about 3,000 to about 40,000 g/mol.

5. The polycarbonate resin composition of claim 1, wherein said multifunctional unsaturated monomer is selected from the group consisting of unsaturated carboxylic acids; acid anhydrides; hydroxyl group containing esters; acrylamides;
methacrylamides; and combinations thereof.

6. The polycarbonate resin composition of claim 5, wherein the unsaturated carboxylic acid is selected from the group consisting of acrylic acid, methacrylic acid, and combinations thereof the acid anhydride is maleic acid anhydride; and the hydroxyl group containing ester is selected from the group consisting of 2-hydroxyethyl acrylate, 2-hydroxypropyl acrylate, monoglycerol acrylate, and combinations thereof.

7. The polycarbonate resin composition of claim 1, wherein the methacrylic acid ester is selected from the group consisting of methyl methacrylate, ethyl methacrylate, propyl methacrylate, butyl methacrylate, benzyl methacrylate, and combinations thereof; and the acrylic acid ester is selected from the group consisting of methyl acrylate, ethyl acrylate, propyl acrylate, butyl acrylate, 2-ethylhexyl acrylate, and combinations thereof.

8. The polycarbonate resin composition of claim 1, wherein said polycarbonate resin (A) is a linear polycarbonate resin, a branched polycarbonate resin, a polyester-carbonate copolymer resin, or a combination thereof.

9. The polycarbonate resin composition of claim 1, wherein said polycarbonate resin composition has a scratch width of about 180 μm to about 340 μm measured by the Ball-type Scratch Profile and a pencil hardness of 2 B to 3 H.

10. The polycarbonate resin composition of claim 1, wherein said polycarbonate resin composition has a total light transmittance (TT) of more than about 10%.

11. A molded article prepared from the polycarbonate resin composition of claim 1.

* * * * *